United States Patent [19]

Monte et al.

[11] 4,069,192

[45] Jan. 17, 1978

[54] LIQUID THERMOSETTING RESINS CONTAINING TITANATE SALTS

[75] Inventors: Salvatore J. Monte, Staten Island, N.Y.; Gerald Sugerman, Allendale, N.J.

[73] Assignee: Kenrich Petrochemicals, Inc., Bayonne, N.J.

[21] Appl. No.: 653,773

[22] Filed: Jan. 30, 1976

[51] Int. Cl.² .................................................. C08K 9/04
[52] U.S. Cl. .................................. 260/37 EP; 260/38; 260/42.14; 260/429.5
[58] Field of Search ............. 260/42.14, 429.5, 37 EP, 260/38

[56] References Cited

U.S. PATENT DOCUMENTS

| | | | |
|---|---|---|---|
| 3,310,575 | 3/1967 | Spivack | 260/429.5 |
| 3,697,474 | 10/1972 | Morris et al. | 260/42.14 |
| 3,697,475 | 10/1972 | Morris et al. | 260/42.14 |

Primary Examiner—Sandra M. Person
Attorney, Agent, or Firm—Lewen, Bert J.

[57] ABSTRACT

This invention relates to the use of certain organo-titanium salts for use with fillers for the preparation of epoxy resins and other liquid thermosetting resins; the resulting filled resin compositions; and compositions of such salts and such liquid resins.

The organo-titanate salts of the invention may be represented by the formulas:

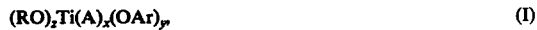

(RO)$_z$Ti(A)$_x$(OAr)$_y$,      (I)

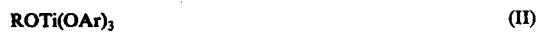

ROTi(OAr)$_3$      (II)

where R is a monovalent alkyl, alkenyl, alkynyl or aralkyl group having from 1 to about 30 carbon atoms or a substituted derivative thereof; A is a monovalent thioaryloxy, sulfonyl, sulfinyl, diester pyrophosphate, diester phosphate or a substituted derivative thereof; OAr is aroxy or a substituted derivative thereof; the sum of $x$, $y$ and $z$ equals 4; $x$ and $z$ may be 1, 2 or 3; and $y$ may be 0, 1 or 2; or

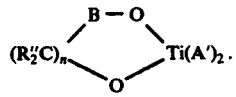

where A' represents a non-hydrolyzable group as defined above for A or an aryl group, B is an alkylene group (CR$_2$″) or carbonyl, R″ may be hydrogen or alkyl groups having 1 to 6 carbon atoms and $n$ may be 1 to 2. Preferably R″ is hydrogen. The R″s in a particular molecule may be the same or different.

14 Claims, No Drawings

LIQUID THERMOSETTING RESINS CONTAINING TITANATE SALTS

This invention relates to compositions of certain organo-titanates, hereafter defined, with liquid thermosetting resins, with or without fillers. The organo-titanates serve to regulate the viscosity of filled resins, permit higher filler loading, enhance the tinctorial power of pigments, and increase the adhesion of filled and unfilled resins to substrates.

It is known that certain organic titanate esters may be used to treat the surfaces of inorganic fillers to enhance their compatibility with polymeric material. Such applications are shown in U.S. Pat. Nos. 3,697,474 and 3,697,475 issued to the Freeport Sulphur Company. These filled polymeric materials are well known and find application in fibers, sheet material and shaped solid articles. The aforesaid patents specifically relate to organic derivatives of orthotitanic acid containing at least two hydrolyzable groups.

In accordance with the instant invention, it has been found that treating inorganic fillers with certain organic titanate salts, hereinafter defined, imparts even greater advantages than that obtained by following the teachings of the aforesaid patents.

The use of certain of the compositions of the present invention improves the rheology properties of filled thermosetting resins, permits higher loading of the filler, achieves more efficient use of pigments and opacifiers, and retards settling of dispersions.

In addition, organo-titanates give the thermosetting resins improved mechanical properties, far better than those obtained heretofore. Stress, tensile strength, flexibility, shear resistance, resistance to chemical attack and the other advantages of crosslinking are obtained, because the reaction product of the filler and the organic titanate salt is grafted to the resin. Where multi-functionality is present, the compositions will in fact be cross-linked. In all instances, the filler becomes more tightly incorporated in the polymeric structure. This bond results in a structure which is more readily able to transfer energy and therefore results in a stronger material. Where the titanate salt is non-functional, the filler and the resins are bound together by Van der Waal's forces. In unfilled systems, adhesion is improved to substrates, because of the displacement of the hydrolyzable group by the substrate.

The organo-titanate salts which may be used in accordance with the practice of the instant invention may be represented by the formula:

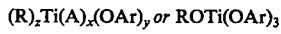

wherein R is a monovalent alkyl, alkenyl, alkynyl or aralkyl group having from 1 to about 30 carbon atoms or a substituted derivative thereof. The R group may be saturated or unsaturated, linear or branched, and may have from 1 to 6 substitutions including halogen, amino, epoxy, cyano, ether, thioether, carbonyl, aryl, nitro or acetal. In a particular molecule, all of the R groups may be the same or different, so long as they fall within the above class. It is preferable that the R group be alkyl having 1 to 6 carbon atoms and be all the same.

The monovalent non-hydrolyzable group (A) may be thioaryloxy, sulfonyl, sulfinyl, diester pyrophosphate and diester phosphate. The thioaroxy group may be a substituted or unsubstituted thiophenoxy or thionaphthoxy group containing up to about 30 carbon atoms. It may be substituted by alkyl, alkenyl, aryl, aralkyl, alkaryl, halo, amino, epoxy, ether, thioether, ester, cyano, carbonyl, or aromatic nitro groups. Preferably, no more than three substituents per aromatic ring are present. The thioaroxy groups wherein the aryl is phenyl or naphthyl are preferred.

The sulfonyl, sulfinyl, diester pyrophosphate and diester phosphate ligand, respectively, have the following formulas:

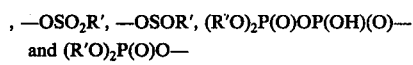

wherein R' is as defined below. Where A is a sulfonyl or a sulfinyl group, it is preferred that R' be phenyl, an alkyl-substituted phenyl or an aralkyl group having from 5 to 24 carbon atoms in the alkyl chain. Where A is a phosphate group, it is preferred that the R' group have from 6 to 24 carbon atoms, and where A is a pyrophosphate group, it is preferred that the R' group by alkyl having up to 16 carbon atoms, most preferably from 6 to 12.

R' may be hydrogen or a monovalent organic group having from 1 to about 30 carbon atoms; particularly, an alkyl, alkenyl, aryl, aralkyl or alkaryl group. The aryl groups may be substituted or unsubstituted phenyl or naphthyl groups, preferably containing up to 30 carbon atoms. Additionally, the R' group may be substituted with halo, amino, epoxy, ether, thioether, cyano, carbonyl and/or aromatic nitro substituents. Generally up to about 6 substituents may occur per R' group. The R' group may contain intermediate hetero atoms such as sulfur or nitrogen in the main or pendant substituents. R' is preferably a long chain group having 6 to 18 carbon atoms. Most desirably, all R's are the same.

The (OAr) group may be a substituted or unsubstituted phenyl or napthyl group, preferably containing up to 30 carbon atoms. The substitutions are preferably up to 3 alkyl groups, each having 1 to 6 carbon atoms. In the above formula, the sum of $x$, $y$ and $z$ must be 4; $x$ and $z$ may be 1, 2 or 3; and $y$ may be 0, 1 or 2. Preferred are those compounds where $z$ is 1.

Another class of organo-titanates useful in the practice of the invention are the chelates having the formula:

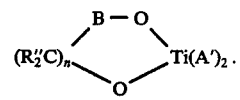

where the R"s are monovalent radicals which may be hydrogen or an alkyl group having from 1 to 6 carbon atoms and where $n$ may be 1 or 2. Preferably, the R"s are hydrogen, but they may also be methyl, ethyl or other short chain alkyl groups. The R"s need not be the same in a particular molecule or on each methylene unit. B is an alkylene group ($CR_2''$) or carbonyl. A is a monovalent non-hydrolyzable group as defined above. By non-hydrolyzable is meant a group which will not cleave in a neutral aqueous solution at a temperature less than 100° C. Hydrolysis can be determined by analyzing for liberated acids or alcohols.

Examples of specific R ligands are: methyl, propyl, cyclopropyl, cyclohexyl, tetraethyloctadecyl, 2,4-dichlorobenzyl, 1-(3-bromo-4-nitro-7-acetylnaphthyl)- ethyl, 2-cyano-furyl, 3-thiomethyl-2-ethoxy-1-propyl and methallyl.

Examples of A ligands useful in the practice of this invention include 11-thiopropyl-12-phenyloctadecylsulfonyl, 2-nitrophenylsulfinyl, di(2-omega-chlorooctyl)phenyl phosphator, diisonicotinyl pyrophosphato, 2-nitro-3-iodo-4-fluorothiophenoxy, 2-methallylphenoxy, phenylsulfinyl, 4-amino-2-bromo-7-naphthylsulfonyl, diphenyl pyrophosphato, diethylhexyl pyrophosphato, di-sechexylphenyl phosphato, dilauryl phosphato, methylsulfonyl, laurylsulphonyl and 3-methoxynaphthalene sulfinyl. Examples of aroxy groups are 2,4-dinitro-6-octyl-7-(2-bromo-3-ethoxyphenyl)-1-naphthoyl and 3-cyano-4-methoxy-6-benzoylphenoxy.

Examples of the R' groups are numerous. These include straight chain, branched chain and cyclic alkyl groups such as hexyl, heptyl, octyl, decyl, dodecyl, tetradecyl, pentadecyl, hexadecyl, octadecyl, nonadecyl, eicosyl, docosyl, tetracosyl, cyclohexyl, cycloheptyl, and cyclooctyl. Alkenyl groups include hexenyl, octenyl and dodecenyl.

Halo-substituted groups include bromohexyl, chlorooctadecyl, iodotetradecyl and chlorooctahexenyl. One or more halogen atoms may be present, as for example in difluorohexyl or tetrabromooctyl. Amino-substituted groups include aminocaproyl, aminostearyl, aminohexyl, aminolauryl and diaminooctyl.

In addition to the foregoing aliphatic groups, groups containing hetero-atoms, such as oxygen, sulfur or nitrogen, in the chain may also be used. Examples of these radicals are ethers of the alkoxyalkyl type, including methoxyhexyl and ethoxydecyl. Alkylthioalkyl groups include methylthiododecyl groups. Primary, secondary and tertiary amines may also serve as the terminal portion of the hydrophobic group. These include diisopropylamino, methylaminohexyl, and aminodecyl.

The aryl groups include the phenyl and naphthyl groups and substituted derivatives. Substituted alkyl derivatives include toluyl, xylyl, pseudocumyl, mesityl, isodurenyl, durenyl, pentamethylphenyl, ethylphenyl, n-propylphenyl, cumyl, 1,3,5-triethylphenyl, styryl, allylphenyl, diphenylmethyl, triphenylmethyl, tetraphenylmethyl, 1,3,5-triphenylphenyl. Nitro- and halo-substituted may be exemplified by chloronitrophenyl, chlorodinitrophenyl, dinitrotoluol, and trinitroxylyl.

Amine-substituted components include methylaminotoluyl, trimethylaminophenyl, diethylaminophenyl, aminomethylphenyl, diaminophenyl, ethoxyaminophenyl, chloroaminophenyl, bromoaminophenyl and phenylaminophenyl. Halo-substituted aryl groups include fluoro-, chloro-, bromo-, iodophenyl, chlorotoluyl, bromotoluyl, methoxybromophenyl, dimethylaminobromophenyl, trichlorophenyl, bromochlorophenyl, and bromoiodophenyl.

Groups derived from aromatic carboxylic acids are also useful. These include methylcarboxylphenyl, dimethylaminocarboxyltoluyl, laurylcarboxyltoluyl, nitrocarboxyltoluyl, and aminocarboxylphenyl.

Titanates wherein R' is an epoxy group include tall oil epoxides (a mixture of 6 to 22 carbon alkyl groups) containing an average of one epoxy group per molecule and glycidol ethers of lauryl or stearyl alcohol.

Substituted naphthyl groups include nitronaphthyl, chloronaphthyl, aminonaphthyl and carboxynaphthyl groups.

Illustrative of the compounds useful in the instant invention are: $(i-C_3H_7O)Ti(OSOC_6H_4NH_2)_3$; $(i-C_3H_7O)Ti(OSO_2C_6H_4C_{12}H_{25})_2(OSO_2C_6H_4NH_2)$; $(i-C_3H_7O)Ti[OP(O)(OC_8H_{17})_2]_3$; $(i-C_3H_7O)Ti(OC_6H_4C(CH_3)_2C_6H_5)_3$; $(i-C_3H_7O)Ti[OP(O)(OC_{12}H_{25})_2]_3$; $(C_6H_{12}O)Ti(OC_6H_4NH_2)_3$; $(n-C_4H_9O)_2Ti[OPO(OC_6H_4C_8H_{17})_2]_2$; $(CH_3O)Ti(2-SC_{10}H_7)_3$; $(i-C_3H_7O)(n-C_{12}H_{25}O)Ti(OSO_2C_6H_5)_2$.

Illustrative of the chelate compounds useful in the instant invention are: $OCH_2C(O)OTi(OSOC_6H_4NH_2)_2$; $OCH_2C(O)OTi(OSO_2C_6H_4C_{12}H_{25})(OSO_2C_6H_4NH_2)$; $OCH_2CH_2—OTi[OP(O)(OC_8H_{17})_2]_2$; $OCH_2C(O)OTi(OC_6H_4C(CH_3)_2C_6H_5)_2$; $OCH_2CH(CH_3)OTi[OP(O)(OC_{12}H_{25})_2]_2$; $OCH_2C(O)OTi(OC_6H_4NH_2)_2$; $OCH_2C(C_2H_5)_2OTi[OP(O)(OC_6H_4C_8H_{17})_2]_2$; $OCH_2C(O)OTi[OP(O)(OH)OP(O)(OCH_3)_2]_2$; $OC(CH_3)_2C(O)OTi[OC_6H_2—(NO_2)_3]_2$; $OCH_2C(O)OTi(2-SC_{10}H_7)$; $OCH_2C(O)OTi)OSO_2C_6H_5)_2$; $OC_2H_4C(O)OTi[OCOCH_2N(C_2H_4(OC_2H_4)_{12}OCH_2C_6H_4.NO_2]_2$; $OC_2H_4C(O)OTi[OP(O)(OH)OP(O)(OC_8H_{17})_2]_2$; $OC_2H_4C(O)OTi(OC_6H_4CH_3)_2$; $OC_2H_4C(O)OTi[OP(O)(OC_6H_5)_2]_2$; $OC_2H_4C(O)OTi(OSOC_{10}H_7)_2$; $OC_2H_4C(O)OTi(OSO_2C_6H_4Br)_2$; $OC_2H_4C(O)OTi[OP(O)(C_6H_4NH_2)]_2$; $OC_2H_4C(O)OTi(OC_6H_4NH_2)(OSO_2C_6H_5)$.

Many of the effects which can be obtained by using the titanates of the particular invention are specific to particular polymer systems and particular titanate compounds. For example, viscosity building is obtained with all of the thermosetting liquid polymers of the invention with the sulfonyl derivatives. On the other hand, the phosphate derivatives are most useful in building the viscosity of the polyacrylate-type compounds.

Another selective phenomenon is the use of the phosphates to increase the hiding power of pigments. Both the chelated and non-chelated phosphates are useful in this respect with all light-colored polymers. The chelated titanates are advantageously used where substantial amounts of free water are present in the system, such as where aqueous medium solvents are employed. These chelates are particularly effective along with hydrotropes such as alkanol amines, e.g., triethanol amine. In systems where amine volatilization is advantageous, e.g., where it can be recovered for reuse or is detrimental to the finished product, amines such as 2-dimethylamino-1-pentanol may be used. These latter materials further increase the ease of dispersion of the titanate in water.

The coating compositions may be applied in any conventional manner, as understood by those skilled in the art. Where the formulation is to be sprayed, it has been found preferable to use aryl and phosphato-substituted materials; while, where the formulation is to be applied with a brush or roller, aryl, phosphato or sulfonyl-type preferred. Basically, the selection of the appropriate titanate is dependent on the shear characteristics of the formulation desired.

The organo-titanium chelates of the invention may be prepared by reacting the esters having the formula $(OR)_2Ti(A)_2$ with an equimolar amount of 2-hydroxypropionic acid or hydroxyacetic acid or their carbon substituted derivatives or the chelate may be formed first followed by the esterification step.

The $(Or)_2Ti(A)_2$ compounds may be readily prepared as shown in the Freeport Sulphur Company U.S. Pat. Nos. 3,660,134, 3,697,494 and 3,697,495.

The amount of the titanate reacted is at least 0.01 part, preferably from 0.1 to 5 parts, and most preferably between 0.2 and 2 parts, per 100 parts of comminuted solid filler. The optimum proportions required are a function of the particular filler and the titanium salt selected, and the degree of the comminution, i.e., the effective surface area, of the solid. The reaction of the titanate takes place on the surface of the filler. The hydrolyzable group splits off and an organic hydrophobic surface layer is formed on the inorganic solid. The unmodified solid, in the absence of the titanates, is difficult to disperse in an organic medium because of its hydrophilic surface. The organo-titanium compound may be incorporated into an organic medium (low molecular weight liquids or higher molecular weight polymeric solids) with the inorganic solid. Alternatively, the organo-titanate may be first reacted with the inorganic solid in the absence of an organic medium and thereafter admixed with the resin.

Also, according to the invention herein, the reaction with the RO groups on the organo-titanates may be carried out neat or in an organic medium to form a liquid, solid or paste-like solid dispersion which can be used in the compounding of the final polymeric system. Such dispersions are very stable, i.e., having little tendency to settle, separate, or harden on storage to a non-dispersible state.

By "liquid thermoset resins" are meant resins which are in the liquid state under the conditions of application and include casting resins, i.e., liquid monomers or incompletely-polymerized polymers, usually containing catalysts or curing agents, capable of becoming hard after they are cast in molds, and coating resins, i.e., liquid monomers or incompletely-polymerized polymers, generally in a solvent or non-solvent extender, which are capable of application by brush, roller, spray or dipping. These include paints, varnishes, enamels and lacquers. The materials of particular interest in the instant application are epoxy resins, alkyds, polyacrylates, polymethacrylates, furans and phenolics.

A wide variety of epoxy resins may be prepared in accordance with the subject invention. Reference may be made to U.S. Pat. No. 2,698,315, issued Dec. 28, 1954; U.S. Pat. No. 2,707,708, issued May 3, 1955; and U.S. Pat. No. 2,705,223, issued Mar. 29, 1955, all of which are incorporated herein by reference.

The epoxy resins are commonly complex polymeric reaction products of polyhydric alcohols with polyfunctional halohydrins such as epichlorohydrin and glyceryl dichlorohydrin. The products obtained may contain terminal epoxy groups, or terminal epoxy groups and terminal primary hydroxyl groups. See, for example, Column 6 of U.S. Pat. No. 2,872,428, issued Feb 3, 1959.

Alkyd resins are a type of unsaturated polyester modified with oil or a fatty acid. The polyacrylates and methacrylates are formed by the polymerization of methyl methacrylate and methyl acrylate, though the higher esters such as ethyl, butyl, lauryl and stearyl methacrylates and the ethylbutyl and 2-ethylhexyl acrylates are commonly used. Such resins are sometimes modified with non-acrylic monomers such as acrylonitrile, butadiene or styrene.

The furan resins are thermosetting resins obtained primarily by the condensation polymerization of furfural alcohol in the presence of a strong acid, sometimes in combination with formaldehyde or furfural aldehyde. The term also includes resins made by condensing phenol with furfuryl alcohol or furfural, and furfurylketone polymers.

Phenolic resins are a family of thermoset resins made by the reaction of phenols with aldehydes such as formaldehyde, acetaldehyde, or furfuryl aldehyde. For casting B-stage resins are generally used. Examples of the phenols are di- and trivalent phenols such as cresol, resorcinol and cardanol. In casting resin applications, a large excess of formaldehyde is generally used with sodium hydroxide as the catalyst. The reaction is usually carried out at about 64° C.

The filler may be particulate or fibrous and of varied shape or size, so long as the surfaces are reactive with the hydrolyzable group of the organo-titanium compound. Examples of inorganic reinforcing materials include metals, clay, carbon black, calcium carbonate, barium sulfate, silica, mica, glass and asbestos. Reactive inorganic materials include the metal oxides of zinc, magnesium, lead, and calcium and aluminum, and iron filings and turnings. Examples of inorganic pigments include titanium dioxide, iron oxides, zinc chromate, and ultramarine blue. Examples of organic pigments include phthalocyanine blue, quinacyridone yellow, iron blue and naphthol blue. As a practical matter, the particle size of the particulate materials should not be greater than 1 mm, preferably from 0.1 micron to 500 micron.

The amount of filler used depends on the particular polymeric material, the filler and the property requirements of the finished products. Broadly, from 50 to 1500 parts of filler may be used based on 100 parts of polymer, preferably from 300 to 1000. The optimum amount may be readily determined by one skilled in the art.

It is imperative that the titanium salt be properly admixed with the filler to permit the surface of the latter to react sufficiently. The optimum amount of the titanium salt to be used is primarily dependent on the effect to be achieved, the available surface area of and the bonded water in the filler.

Reaction is facilitated by admixing under the proper conditions. Optimum results depend on the properties of the titanium salt, namely, whether it is a liquid or solid, and its decomposition and flash points. The particle size, the geometry of the particles, the specific gravity, the chemical composition, among other things, must be considered. Additionally, the treated filler must be thoroughly admixed with the liquid resin. The appropriate mixing conditions depend on the type of polymer, its chemical structure, etc., as will be readily understood by those skilled in the art.

Where the filler is pretreated with the organic titanate, it may be admixed in any convenient type of intensive mixer, such as a Henschel or Hobart mixer or a Waring blender. Even hand mixing may be employed. The optimum time and temperature are determined to obtain substantial reaction between the inorganic material and the organic titanate. Mixing is performed under conditions at which the organic titanate is in the liquid phase, at temperatures below the decomposition temperature. While it is desirable that the bulk of the hydrolyzable groups be reacted in this step, this is not essential, since the substantial completion of the reaction may take place when the filler is admixed with the polymer.

Polymer processing, e.g., high shear mixing, is generally performed at a temperature well above the second order transition temperature of the polymer, desirably at a temperature where the polymers will have a low melt viscosity.

Temperatures for mixing the liquid resins with the treated filler are well known in the art and are typically performed at near ambient temperatures. A variety of mixing equipment, typically turbine, propeller or cement mixers, may be used.

When the organic titanate and the filler are dry-blended, thorough mixing and/or reaction is not readily achieved and the reaction may be substantially completed when the treated filler is admixed with the polymer. In this latter step, the organic titanate may also react with the polymeric material if one or more of the R' groups is reactive with the polymer.

The organic titanate used in the invention may be readily prepared by reacting the tetraalkyl titanates with the appropriate acids. Examples of such preparation are set forth in copending applicatons Ser. Nos. 618,222 and 618,223, both filed Sept. 30, 1975. Four representative preparations follows.

EXAMPLE A

Preparation of Isooctyl Tri(cumyl phenoxy) Titanium

To a pyrex-lined metal vessel, equipped with an agitator, internal heating and cooling means, a vapor condenser and a distillate trap, is added 1 mole of isooctanol, 3 moles of mixed isomer cumyl phenol and 2 liters of mixed isomer xylene. The reactor is stirred, flushed with nitrogen and 4.2 moles of sodamide are added at a controlled rate and with cooling to maintain the reaction mass at a temperature not over about 100° C. By-product ammonia is vented. The sodamide treated forms a heavy slurry which is refluxed for about 10 minutes to remove dissolved ammonia. The reactor contents are then cooled to about 90° C. and maintained at this temperature while 1 mole of $TiCl_4$ is added over a period of three hours. After the $TiCl_4$ addition, the resulting mixture is refluxed for 2 hours, cooled to about 100° C. and filtered. The filter cake is washed with about 500 cc of xylene and discharged. The washings are combined with mother liquor and charged to a still. Volatiles are removed to give a bottoms having a boiling point at 10 mm Hg of over 150° C. weighing about 800 g. (This is over 95% of theory.) Elemental analysis of bottoms product, a heavy dark red paste or glossy solid, is consistent with the formula $(i\text{-}C_8H_{17}O)Ti[OC_6H_5C(CH_3)_2C_6H_5]_3$.

EXAMPLE B

Preparation of $(CH_3O)_{0.6}Ti[OP(O)(OH)OP(O)(OC_8H_{17})_2]_{3.4}$

A reactor such as that described in Example A is charged with 1 mole of tetramethyl titanate. Thereafter, with stirring, 3.4 moles of dioctyl pyrophosphoric acid is added over about a one hour period. External cooling is maintained during the addition to maintain a reaction mass temperature in the 20° to 55° C. range. The reaction mixture formed is distilled to bottoms temperature of 150° C. to remove substantially all by-product methanol. Elemental analysis of the residual pale yellow heavy oil is consistent with the formula $(CH_3O)_{0.6}Ti[OP(O)(OH)OP(O)(OC_8H_{17})_2]_{3.4}$. The yield is over 95% of theory. The product has a specific gravity at 74° F. of 1.036, a flash point (COC) of 330° F., a viscosity at 74° F. of 3200 cps, a maximum pour point of 30° F. and a decomposition point of 410° F.

EXAMPLE C

Preparation of $(o\text{-}ClC_6H_4CH_2O)_{1.2}Ti(OSO_2C_6H_4NH_2)_{2.8}$

In a reactor such as that described in Example A, a solution of 1 mole of tetraisopropyl titanate in 2 liters of 2,6-dimethylnaphthalene is heated at 200° C. While maintaining this temperature for a period of 2.5 hours, 1.25 moles of ortho-chlorobenzyl alcohol and 2.8 moles of mixed isomers of aminobenzene sulfonic acid are added sequentially. By-product volatiles (mainly methanol) are continuously removed by distillation. After cooling, the resulting grey solid is filtered, washed with cyclohexane and vacuum oven dried to give about 565 g (82% yield) of grey solid product. Said product is found to have an elemental analysis and OH number consistent with the above formula.

EXAMPLE D

Preparation of 2,2-dimethyl-3-oxy-3-phenylcaproyl acetyl dodecylbenzenesulfonyl titanate.

Charged to a stirred 1 liter reactor equipped with external heat/cooling, reflux/distillation and vacuum capabilities, is 1.0 mole of tetraisopropyl titanate. The unit is set for reflux at atmospheric pressure. Thereafter 1.0 mole of dodecylbenzenesulfonic acid is added over about one half hour, followed by 1.0 mole each of glacial acetic acid and 2,2-dimethyl-3-oxy-3-phenylcaproic acid sequentially, each over a half hour period. Limited heat evolution is observed upon the addition of each reagent. After the additions are completed, the reaction mixture is refluxed for one hour at atmospheric pressure. The reaction mixture is then cooled to below 50° C. and the by-product isopropanol removed by distillation in vacuo to a bottoms temperature of about 150° C. at 10 mm Hg. The volatilized isopropanol is recovered via trapping in a liquid nitrogen cooled receiver. Recovery of isopropanol is about 3.7 moles, i.e., 90% of theory. A small amount of isopropyl acetate is also recovered. A yield of pasty white product in excess of 90% of theory is obtained as residue. Purification was effected by recrystallization from ligroin to form a white crystal (m.p. 87°–89° C.).

EXAMPLE 1

This example shows the effect on viscosity of the organo-titanates on a sand-filled epoxy resin (Epon 828, a trademark of Shell Chemical Company for an epoxy resin which is a condensation product of epichlorohydrin and bis-phenol A having a molecular weight of approximately 13,000). To 100 parts of this resin and 12 parts of diethylenetriamine were added incremental amounts of sand (Colorquartz No. 28 filler, a trademark of 3M Company) until, after 2 minutes of mixing, the viscosity equaled 200,000 centipoise. Following the same procedure, three solutions were prepared. The first solution was titanate-free. The second contained isopropyl tricumylphenyl titanate, and the third isopropyl tri(dodecylbenzenesulfonyl)titanate. Incremental amounts of filler were again added until, after 2 minutes of mixing, the viscosity was 200,000 centipoise. The amount of titanate added was approximately 1% based on the total filler added.

Table 1 below shows the filler loading to achieve the aforesaid viscosity;

Table 1

| Titanate | Parts Sand per Part of Solution |
|---|---|
| None - Control | 3.5 |
| Isopropyl tricumylphenyl titanate | 5.2 |
| Isopropyl tri(dodecylbenzenesulfonyl) titanate | 0.55 |

The above example shows that the first composition of the invention contains substantially more filler at the same viscosity as compared to the standard case where no titanate is added. This volumetric extension of the composition is a particular advantage since the filler materials are substantially less costly than the epoxy resin. The last composition shows an increase in viscosity because it gels the epoxy resin in the presence of the filler.

EXAMPLE 2

This example shows the effect of the titanates on an unfilled epoxy. Four epoxy hardener mixtures were prepared, containing 80 parts of Epon 828 and 20 parts of an aliphatic amine curative, Celanese 874 hardener. To one of these freshly prepared samples was added 2 parts of isopropyl triisostearoyl titanate, to another 2 parts of isopropyl tri(dodecylbenzenesulfonyl)-titanate, and to another 2 parts of 2-oxyacetyl di(dodecylbenzenesulfonyl) titanate, the compositions containing the last two named titanates being within the scope of the instant invention. All of the mixtures were stirred for 2 minutes and their viscosity measured on a Brookfield viscosimeter. The results obtained are shown in the Table below.

Table 2

| Organo-titanium Compound | Brookfield Viscosity $\times 10^3$ cps |
|---|---|
| None | 3.9 |
| Isopropyl triisostearoyl titanate | 5.6 |
| Isopropyl tri(dodecylbenzenesulfonyl) titanate | 28. |
| 2-oxyacetyl di(dodecylbenzenesulfonyl) titanate | 9.4 |

The above data show that the last two compositions, particularly the one containing the isopropyl tri(-dodecylbenzenesulfonyl) titanate of the invention, have a substantially higher viscosity than the other two samples. The other titanate salt tested, isopropyl triisostearoyl titanate, while having limited viscosity-building effect, was substantially less effective.

EXAMPLE 3

The compositions of the invention may also have a reduced viscosity as compared to untreated epoxy systems. This is of particular importance because it lowers the energy requirements for mixing in preparing such compositions. In this example, sand-filled epoxy systems were prepared having the formulations shown in the following table; the epoxy was first mixed with the titanates and the sand thereafter added in a kettle with stirring for a period of 2 minutes.

Table 3

| Components, parts by wt. | 1 | 2 | 3 | 4 |
|---|---|---|---|---|
| Epon 828 | 200 | 150 | 150 | 150 |
| Colorquartz No. 28 | — | 75 | 75 | 75 |
| Isopropyl triisostearyl titanate | — | — | 1.5 | — |
| Isopropyl tri(dioctylphosphato) titanate | — | — | — | 1.5 |
| Viscosity | 9.5M | 15.7M | 13M | 7M |

It will be noted that Formula 4, a composition of the invention, had a viscosity lower even than the unfilled epoxy resin. In contrast, Formulation 3, also containing a titanate, but not one within the scope of the instant invention, reduced the viscosity somewhat but not nearly to the degree of the isopropyl tri(dioctylphosphato) titanate.

EXAMPLE 4

This example shows that incorporating the organo-titanate salts discussed herein can prevent phase separation of filled epoxy resins. Two suspensions containing 67 wt. % of nominal 100 micron size ground granite in Epon 828 epoxy resin were prepared. To one sample was added 0.7 wt. % of isopropyl tri(dioctylphosphato) titanate. Both suspensions were mixed thoroughly and permitted to stand. The untreated mix showed visible settling with 20 minutes, whereas the treated mixture showed no discernible separation even after 14 hours. This clearly shows that suspensions in epoxy resins within the scope of the invention have superior antisettling properties. The organo-titanate compound also reduced the viscosity of the mixture from 154,000 cps at 25° C. to 94,000 cps.

EXAMPLE 5

This example shows the use of the organic titanate salts of the invention in four paint systems. The resins were an unmodified epoxy resin (Epon 828), a medium oil alkyd resin, an epoxy ester resin (esterification product of an epoxy resin and an unsaturated fatty acid having an average molecular weight of about 11,000) and an acrylic resin. Each resin contained 6 pounds of rutile silane-treated $TiO_2$ pigment per gallon of finished paint and 3 pounds per gallon of magnesium silicate 170 extender and was applied as a paint. The epoxy resin was cured in the conventional manner with a polyamide, while the others were air-dried. The controls were compared to paint formulations containing isopropyl, tri(dioctylphosphato) titanate (0.9 wt. % based on combined pigment and filler loading).

It was found that the same tinting strength could be achieved using only 4.5 pounds per gallon of the $TiO_2$ and that the magnesium silicate level could be increased to 4 pounds per gallon. This results in a less expensive formulation because the amount of costly $TiO_2$ required is reduced 25%, as determined visually. Further experiments show that the use of the titanates of the invention is even more effective if the $TiO_2$ is not silane-treated.

It was further noted that the paint formulations containing the titanates have better hiding power, gloss, flexibility, scratch resistance, impact resistance and adhesion.

EXAMPLE 6

Using the epoxy ester resin system described in Example 5, the effect of isopropyl, tri(dioctylphosphato) titanate on the tinting strength of phthalo blue and iron blue was determined. To determine the optimum tinting strength, various amounts of acrylate-treated phthalo blue and untreated phthalo blue were added to the solvent-based systems. The solvent was a 1:1 mixture of toluene and methyl ethyl ketone. It was determined that 1.2% by weight of the acrylate-treated phthalo blue and 0.8% by weight of the untreated phthalo blue gave the optimum tinting strength.

In order to show the efficacy of the invention various amounts of the aforesaid titanate were added to the system. The optimum amount of the titanate was found to be 0.8 to 0.9% based on the weight of the tinting pigment. At these levels, 20% less phthalo blue was needed to achieve the optimum tinting for the solvent-based systems. Considering the high cost of such pigments, this is a substantial economic savings. it was also noted that even at these lower pigment concentrations, the tinting is slightly improved by using the titanate.

In the case of the iron blue, concentrate dispersions containing the tinting pigment were prepared using 0.3%, 0.6%, 0.9% and 1.2% of the isopropyl, tri(dioctylphosphato) titanate, based on pigment.

Twenty parts of the concentrate were added to a standard base formulation and it was observed that from 1.5 to 1 wt. % enhanced the tinting strength. The 0.3% concentrate did not show enhanced tinting. The 0.6% concentrate did show some increase in tinting strength. The 0.9% concentrate, on the other hand, showed upon inspection a five-fold increase in the tinting intensity as compared to the titanate-free material. Interestingly, the 1.2% concentrate lessened the intensity of the tint, though it did increase the hiding power and dispersion as compared to the titanate-free formulation. It is believed that amounts of titanate over 1% result in unreacted titanate which reacts with the $TiO_2$ in the base formation, enhancing the latter's whitening power and, in turn, diminishing the tinting effect of the coloring pigment.

EXAMPLE 7

This example shows that the tinting effect of pigments can also be enhanced in a water-based acrylic paint. The paint used was Rowe Products Inc. SRW30X White and the pigment paste dispersion (Daniel Products Co. Tint-Ayd #WD-2228, Aqueous Tinting Color, Phthalo Blue) containing 32% pigments and 39% total solids. Glycol di(dioctylphosphato) titanate was first mixed with the pigment to form blends containing 0.3%, 0.6%, 0.9%, 1.2% and 1.5% titanate based on the weight of the paste dispersion. To 100 parts of paint, 0.2 part of each of the treated paste dispersions was added. Observation showed, as compared to the control, even at the 0.3% level, that there was increased dispersion and flow. While increased tinting resulted in all cases, the enhancement of blue coloration was optimum with the 0.9% sample.

EXAMPLE 8

This example shows the use of isopropyl tri(dioctylpyrophosphato) titanate for improving the chemical resistance of an epoxy paint. Six formulations were prepared, three of which were titanate-free. The three other formulations were prepared using the titanate of the invention. The filler loading was determined to give a formulation with the same viscosity as the commerical formulation.

Each formulation contained 100 parts by weight of Epon 828, 30.50 parts of methyl isobutyl ketone, 17.50 parts of xylol, 1.32 parts each of lecithin and pine oil, 0.66 part of a flow control agent, 50 parts of titanium dioxide, and 25 parts of barium sulfate. In addition to these components, the following table shows the other components in the specific formulations:

Table 4

| Base | Non-Titanate | | | Titanate | | |
|---|---|---|---|---|---|---|
| | 1 | 2 | 3 | 4 | 5 | 6 |
| Isopropyl tri(dioctylpyrophosphato) titanate | — | — | — | 3.00 | 1.70 | 1.75 |
| Magnesium silicate | 28 | — | — | 110 | — | — |
| Clay | 25 | 25 | 25 | 107 | — | — |
| Micronized silica (> 400 mesh) | — | 25 | — | — | 227 | — |
| Micronized silica (250 – 325 mesh) | — | — | 23 | — | — | 232 |

The flow control agent contained 4.12 parts 2-dimethylamino-1-pentanol, 30% sol.; 8.40 parts flow control agent; 43.82 parts hydrocarbon resin; 70.67 parts polyamide hardener; 54.04 parts isopropyl alcohol; and 73.80 parts xylol.

It is immediately apparent from the above table that the formulations of the invention reflect a four- to five-fold increase in loading capability. It also shows that micronized silica is a viable extender in presence of titanate, while without the titanate it cannot be used because of the extremely high viscosity of the formulation.

The following table shows the results of tests preformed on a 3 mil wet drawdown of the cured paint on each of the six formulations.

Table 5

| | Non-Titanate | | | Titanate | | |
|---|---|---|---|---|---|---|
| | 1 | 2 | 3 | 4 | 5 | 6 |
| Gloss (60° F. Glossometer) | 90 | 80 | 80 | 50 | 40 | 45 |
| Flexibility* - 1" mandrel | F | F | F | P | P | P |
| - ½" mandrel | — | — | — | P | P | P |
| - ¼" mandrel | — | — | — | F | — | — |
| Hardness | — | 2325 | 2400 | 2500+ | 2500+ | 2500+ |
| Hoffman Scratch Tester for Adhesion | — | 2075 | 2100 | 2500+ | 2500+ | 2500+ |

*F = Fail; P = Pass

| Chemical Immersion - 48 Hours* | | | | | | |
|---|---|---|---|---|---|---|
| Acetic Acid Concentrate | F | F | F | G | E | E |
| Phosphoric Acid Conc. | F | F | F | G | E | E |
| 50% Sulfuric Acid | F | G | G | E | E | E |
| 95% Sulfuric Acid | F | F | F | G | G | E |
| 98% Sulfuric Acid Conc. | F | F | F | G | M | G |
| HCl Concentrate | F | M | F | G | E | E |
| Perchloroethylene Solvent | F | F | F | F | E | E |
| Chromic Acid | G | E | E | E | E | E |
| Oleic Acid | G | G | G | E | E | E |
| Citric Acid | G | G | G | E | E | E |
| Formic Acid | F | M | F | G | E | E |
| Lauric Acid | G | G | G | E | E | E |
| 50% Sodium Hydroxide | G | E | E | E | E | E |
| 50% Ammonium Hydroxide | G | E | E | E | E | E |
| Ammonium Nitrate | G | E | E | E | E | E |
| NaCl | G | E | E | E | E | E |
| 10% NaCl Solution | G | E | E | E | E | E |

Table 5-continued

|  | Non-Titanate | | | Titanate | | |
| --- | --- | --- | --- | --- | --- | --- |
|  | 1 | 2 | 3 | 4 | 5 | 6 |
| Linseed Oil | G | E | E | E | E | E |

*E = Excellent, no observable effect;
G = Good, discoloration;
M = Moderate, substrate adhesion failure;
F = Failure, film integrity destroyed.

It can be seen that in each and every case the chemical resistance of the titanate-treated paints is as good as or better than those of the prior art. The increased chemical resistance may be partially attributed to the increased filler content of the resultant film. While the magnesium silicate did not stand up completely against acid attack, the micronized silica is inherently more chemical-resistant.

EXAMPLE 9

Isopropyl tri(dodecylbenzenesulfonyl) titanate can also be used as a primer for epoxy paints. A 5% solution of the titanate is made in isopropyl alcohol and xylol. The solution is sprayed, rolled, or brushed on an uncleaned substrate, that is, a surface containing a limited amount of grease and oil, in a very thin layer. The solvent is flashed off. Thereafter, an epoxy paint is applied to both the primed and unprimed substrate. It is found that the paint applied to the primed surface, though not totally clean, has acceptable adhesion, while that applied to the unprimed surface shows evidence of peeling.

EXAMPLE 10

Flooring compounds were prepared using 88 parts of Epon 828, 12 parts of triethylene-tetramine and with the amounts of organo-titanium compound and sand (Berkley #1) shown below. The formulations were cured at room temperature and the strength measured after five days. Table 6 shows the results obtained:

Table 6

| Additive | Parts by Weight | Sand, Parts | Compressive Strength, psi | Tensile Strength, psi |
| --- | --- | --- | --- | --- |
| None | — | 200 | 12 M | 0.9 M |
| " | — | 250 | 10.9 M | 0.76 M |
| " | — | 300 | 9.7 M | 0.71 M |
| " | — | 350 | NP | NP |
| Isopropoxy titanium tri-(cumylphenylate) | 2 | 200 | 13.7 M | 1.15 M |
| " | 2.5 | 250 | 12.2 M | 0.96 M |
| " | 3 | 300 | 11.1 M | 0.91 M |
| " | 4 | 400 | 10.0 M | 0.85 M |
| " | 4.5 | 450 | NP | NP |
| Isopropoxy titanium tri-(dioctyl)phosphate | 2 | 200 | 12.9 M | 1.42 M |
| " | 2.5 | 250 | 12.3 M | 1.36 M |
| " | 3 | 300 | 11.8 M | 1.28 M |
| " | 3.5 | 350 | 11.6 M | 1.04 M |
| " | 4 | 400 | NP | NP |
| Isopropoxy titanium tri(dioctyl)-pyrophosphate | 2 | 200 | 12.2 M | 1.2 M |
| " | 2.5 | 250 | 11.6 M | 1.15 M |
| " | 3 | 300 | 10.8 M | 1.03 M |
| " | 4 | 400 | 9.5 M | 0.93 M |
| " | 4.5 | 450 | NP | NP |

NP = Not Pourable

The data show that not only is the loadibility increased but so is the mechanical strength of the titanate-containing compositions of the invention over a wide range of sand loadings.

EXAMPLE 11

This example shows the application of the invention to improving the strength of phenolic resins filled with silicon carbide. The following formulation was prepared: 25 parts phenolic resin (Bakelite BRNA-5345); 75 parts silicon carbide (1000 grit); 10 parts hexamethylene tetramine; and 1% based on filler of titanate shown in the table below. The above mixture was cured for 30 minutes at 350° F. and the tensile strength measured. The following table shows the results obtained.

Table 7

| Titanate | Tensile Strength, psi |
| --- | --- |
| None | 200 |
| Isopropyl tricumylphenyl | 470 |
| Isopropyl tri(o-methoxyphenyl) | 540 |

The above table shows the marked improvement on the tensile strength of the phenolic resin.

EXAMPLE 12

This example shows the application of the invention with respect to a phenolic resin filled with alundum. A control formulation was first prepared with 100 parts of a phenolic resin (Bakelite BTNA-5345), 400 parts of alundum (nominal average size 35 microns), 4 parts toluene sulfonic acid and 10 parts hexamethylene tetramine. This control was cured and compared to a similar formulation wherein the alundum was first dry-blended with 8 parts of the titanate shown in Table 8 below. The formulations were both cured for ten minutes at 420° F.

Table 8

| Titanate | Tensile Strength, psi |
| --- | --- |
| Control | 4900 |
| Isopropyl tricumylphenyl | 6400 |

Remarkably, the tensile strength of the compound of the invention is about 30% higher.

EXAMPLE 13

This example shows the application of the invention to improving the strength of furan resins filled with quartz. The following formulation was prepared: 285 parts of a 1:1 furfural-furfuryl alcohol resin; 700 parts 50–100 mesh quartz; 15 parts of p-toluenesulfonic acid; and, except for the control, 3.5 parts of the titanate as shown in Table 9 below. The filler, where treated, was dry-blended prior to mixing with the other ingredients. The above mixture was cured for 24 hours at ambient temperature and the tensile strength measured. The following table shows the results obtained.

Table 9

| Titanate | Tensile Strength, psi |
| --- | --- |
| None | 165 |
| Isopropyl trianthranil | 470 |
| Isopropyl di-4-aminobenzoyl isostearoyl | 340 |
| Isopropyl tricumylphenyl | 370 |
| Hexyl di-2-aminopropionyl, isostearoyl | 260 |
| Ethylene di-4-(N,N-dimethylamino)-benzoyl, methacryl | 280 |

The above data clearly show substantial tensile property improvements with a minimal amount of titanate usage.

We claim:

1. A filled thermosetting resin composition which comprises a resin containing a comminuted filler and organic titanate compound having the formula:

$$(RO)_zTi(A)_x(OAr)_y \qquad (I)$$

$$ROTi(OAr)_3 \qquad (II)$$

where R is a monovalent alkyl, alkenyl, alkynyl or aralkyl group having from 1 to about 30 carbon atoms or a substituted derivative thereof; A is a non-hydrolyzable group having the formula —SAr, —OSO₂R', —OSOR', (R'O)₂P(O)OP(OH)(O)— or (R'O)₂P(O)O—, where R' is hydrogen or an alkyl, alkenyl, aryl, aralkyl or alkaryl group having 1 to 30 carbon atoms or a substituted derivative thereof; Ar is a phenyl or naphthyl group having up to 30 carbon atoms or a substituted derivative thereof; the sum of x, y and z is 4; x and z are 1, 2 or 3; and y is 0, 1 or 2; or

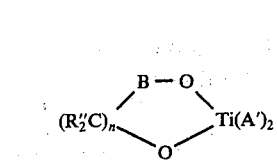

where A' represents a non-hydrolyzable group as defined above for A or an aroxy group, B is an alkylene group (CR₂") or carbonyl, R" is hydrogen or alkyl groups having 1 to 6 carbon atoms and n is 1 to 2; said organic titanate compound being present in amounts sufficient to affect the viscosity of the filled liquid thermosetting resin.

2. The composition of claim 1 wherein the organic titanate compound is of formula I; wherein R is an alkyl group having 1 to 6 carbon atoms; A is a —OSO₂R' group; and R' is a phenyl, an alkyl-substituted phenyl or an aralkyl group having from 5 to 24 carbon atoms in the alkyl chain; z is 1; x is 3; and y is 0.

3. The composition of claim 1 wherein the filler is a pigment and the organic titanate compound is of formula III and the liquid thermosetting resin is an epoxy or an acrylic resin.

4. The composition of claim 3 wherein the organic titanate compound is 2-oxyacetyl di(dodecylbenzene)-titanate or glycol di(dioctylphosphato)titanate.

5. The composition of claim 1 wherein the organic titanate compound is of formula I, wherein R is an alkyl group having from 1 to 6 carbon atoms; A is a group having the formula (R'O)₂P(O)O— wherein R' has from 6 to 24 carbon atoms; and wherein z is 1, x is 3, and y is 0.

6. The filled resin composition of claim 1 wherein the resin is an epoxy resin, a phenolic resin, an acrylate resin or a furan resin.

7. The filled resin composition of claim 1 containing from 0.1 to 5.0 weight % of the titanate compound based on weight of filler.

8. The filled resin composition of claim 1 wherein the composition contains from 50 to 1500 parts of filler for each 100 parts of the resin composition.

9. The filled resin composition of claim 1 wherein the organic titanate is isopropyl tri(dodecylbenzenesulfonyl) titanate.

10. The filled resin composition of claim 1 wherein the organic titanate is isopropyl tri(dioctylphosphato) titanate.

11. The filled resin composition of claim 1 wherein the organic titanate is isopropyl tri(cumylphenyl) titanate.

12. The filled resin composition of claim 1 wherein the organic titanate is 2-oxyacetyl di(dodecylbenzenesulfonyl) titanate.

13. The filled resin composition of claim 1 wherein the filler is sand or granite.

14. The filled resin composition of claim 1 wherein the composition is used as a paint and at least one of the fillers is a pigment.

* * * * *